US010705597B1

(12) United States Patent
Morin et al.

(10) Patent No.: US 10,705,597 B1
(45) Date of Patent: Jul. 7, 2020

(54) INTERACTIVE EXERCISE AND TRAINING SYSTEM AND METHOD

(71) Applicant: Litebox LLC, Boston, MA (US)

(72) Inventors: Jeffrey W. Morin, Exeter, NH (US); Andrew J. Rollins, Rowley, MA (US)

(73) Assignee: Liteboxer Technologies, Inc., Hampton, NH (US)

( * ) Notice: Subject to any disclaimer, the term of this patent is extended or adjusted under 35 U.S.C. 154(b) by 0 days.

(21) Appl. No.: 16/717,588

(22) Filed: Dec. 17, 2019

(51) Int. Cl.
*G06F 3/01* (2006.01)
*G06F 3/0346* (2013.01)
*A63B 71/06* (2006.01)
*A63B 24/00* (2006.01)
*G06T 19/00* (2011.01)
(Continued)

(52) U.S. Cl.
CPC .......... *G06F 3/011* (2013.01); *A63B 24/0003* (2013.01); *A63B 24/0062* (2013.01); *A63B 71/0622* (2013.01); *G06F 3/0346* (2013.01); *G06T 19/006* (2013.01); *A63B 69/32* (2013.01); *A63B 2024/0096* (2013.01); *A63B 2071/0625* (2013.01); *A63B 2071/0655* (2013.01); *A63B 2071/0666* (2013.01); *A63B 2071/0694* (2013.01); *A63B 2220/836* (2013.01); *A63B 2225/02* (2013.01); *A63B 2244/102* (2013.01); *G02B 27/017* (2013.01); *G06F 3/014* (2013.01); *G06F 3/0304* (2013.01); *G06F 3/04815* (2013.01)

(58) Field of Classification Search
CPC . A63B 24/0062; A63B 24/0003; A63B 69/32; A63B 71/0622; A63B 2071/0666; A63B 2071/0694; A63B 2024/0096; A63B 2071/0625; A63B 2071/0655; A63B 2225/02; A63B 2220/836; A63B 2244/102; G02B 27/017; G02B 2027/0138; G02B 2027/014; G02B 2027/0178; G02B 2027/0187; G06F 3/01; G06F 3/011; G06F 3/014; G06F 3/0304; G06F 3/0346; G06F 3/04815; G06K 9/6215; G06T 7/70; G06T 19/003; G06T 19/006; G06T 19/20; G06T 2200/04; G06T 2219/2004; G06T 2219/2016; H04N 13/344
See application file for complete search history.

(56) References Cited

U.S. PATENT DOCUMENTS 9,024,842 B1 * 5/2015 Prada Gomez ......... G06F 3/017
345/156
9,141,194 B1 * 9/2015 Keyes .................... G06F 3/017
(Continued)

*Primary Examiner* — Michael J Eurice
(74) *Attorney, Agent, or Firm* — David H. Judson

(57) ABSTRACT

A virtual reality (VR) system comprising a head-mounted display (HMD) and handheld controller set is enhanced to provide a more realistic end user VR experience, e.g., for boxing or other interactive training. In this approach, and in lieu of simply establishing a boundary area for the VR experience, the user also maps a position of a real-world object into a reference frame of the VR environment. This mapping is facilitated using the handheld controller itself, e.g., as positioned in a backwards-facing manner on the user's forearm. The real-world object is then simulated in the 3D VR environment as rendered by the VR HMD, and the user interacts with the real-world object (or its simulation) to provide a more enjoyable and useful interactive experience.

20 Claims, 5 Drawing Sheets

(51) Int. Cl.
  *A63B 69/32* (2006.01)
  *G02B 27/01* (2006.01)
  *G06F 3/0481* (2013.01)
  *G06F 3/03* (2006.01)

(56) References Cited

U.S. PATENT DOCUMENTS

| | | | |
|---|---|---|---|
| 9,274,597 B1* | 3/2016 | Karakotsios | G06F 3/0346 |
| 9,600,925 B2 | 3/2017 | Katz et al. | |
| 9,678,566 B2 | 6/2017 | Webb et al. | |
| 9,898,091 B2 | 2/2018 | Bristol et al. | |
| 2006/0293617 A1* | 12/2006 | Einav | A61H 1/0274 |
| | | | 601/33 |
| 2007/0282228 A1* | 12/2007 | Einav | A63B 21/4021 |
| | | | 601/33 |
| 2008/0004904 A1* | 1/2008 | Tran | A61B 5/0006 |
| | | | 705/2 |
| 2011/0299034 A1* | 12/2011 | Walsh | A61B 3/102 |
| | | | 351/206 |
| 2011/0306422 A1* | 12/2011 | Nishimoto | G06F 3/017 |
| | | | 463/36 |
| 2012/0056989 A1* | 3/2012 | Izumi | G06F 3/0488 |
| | | | 348/46 |
| 2014/0028539 A1* | 1/2014 | Newham | G06F 1/1694 |
| | | | 345/156 |
| 2014/0282275 A1* | 9/2014 | Everitt | G06F 3/017 |
| | | | 715/863 |
| 2015/0062003 A1* | 3/2015 | Rafii | G06F 3/017 |
| | | | 345/156 |
| 2015/0235631 A1* | 8/2015 | Tanaka | G09G 5/38 |
| | | | 345/672 |
| 2016/0041391 A1 | 2/2016 | Van Curen et al. | |
| 2016/0187969 A1* | 6/2016 | Larsen | G06F 3/012 |
| | | | 345/156 |
| 2016/0195849 A1* | 7/2016 | Takagi | G06H 1/2249 |
| | | | 348/40 |
| 2016/0217614 A1* | 7/2016 | Kraver | G06T 19/006 |
| 2016/0238842 A1* | 8/2016 | Sendai | G02B 27/0176 |
| 2016/0378204 A1* | 12/2016 | Chen | G01C 3/08 |
| | | | 345/156 |
| 2017/0024612 A1* | 1/2017 | Wexler | G06K 9/00389 |
| 2017/0108929 A1 | 4/2017 | Sinko et al. | |
| 2017/0173262 A1* | 6/2017 | Veltz | A61M 5/1723 |
| 2017/0192620 A1* | 7/2017 | Kim | G06F 3/0481 |
| 2017/0209786 A1 | 7/2017 | Zhu et al. | |
| 2017/0228130 A1* | 8/2017 | Palmaro | G06F 3/04815 |
| 2017/0239130 A1* | 8/2017 | Rizzo | G06F 3/015 |
| 2017/0244811 A1* | 8/2017 | McKenzie | H04W 76/14 |
| 2017/0256096 A1* | 9/2017 | Faaborg | G06T 19/20 |
| 2017/0262045 A1* | 9/2017 | Rouvinez | G06T 19/006 |
| 2017/0301135 A1* | 10/2017 | Jagnow | G02B 27/017 |
| 2017/0330387 A1* | 11/2017 | Dearman | G06T 19/20 |
| 2017/0332946 A1* | 11/2017 | Kikkeri | A61B 5/0476 |
| 2018/0012411 A1* | 1/2018 | Richey | G06T 7/73 |
| 2018/0025531 A1* | 1/2018 | Terahata | G02B 27/017 |
| | | | 345/421 |
| 2018/0046245 A1* | 2/2018 | Schwarz | G02B 27/0093 |
| 2018/0181367 A1* | 6/2018 | Goi | G06F 1/163 |
| 2018/0313867 A1* | 11/2018 | Erivantcev | G01P 15/18 |
| 2018/0335834 A1* | 11/2018 | Erivantcev | G06F 3/016 |
| 2018/0335855 A1* | 11/2018 | Erivantcev | G06F 3/011 |
| 2018/0348986 A1* | 12/2018 | Sawaki | G06F 3/011 |
| 2019/0000578 A1* | 1/2019 | Yu | A61B 34/25 |
| 2019/0005838 A1* | 1/2019 | Yu | G06F 3/011 |
| 2019/0005848 A1* | 1/2019 | Garcia Kilroy | A61B 34/10 |
| 2019/0094955 A1* | 3/2019 | Zuber | G06F 3/011 |
| 2019/0102949 A1 | 4/2019 | Sheftel et al. | |
| 2019/0104235 A1 | 4/2019 | Sarkar | |
| 2019/0113966 A1* | 4/2019 | Connellan | G01S 5/0294 |
| 2019/0133689 A1* | 5/2019 | Johnson | G06F 3/0346 |
| 2019/0187784 A1* | 6/2019 | Erivantcev | G06F 1/1686 |
| 2019/0212359 A1* | 7/2019 | Erivantcev | G01C 25/005 |
| 2019/0212823 A1* | 7/2019 | Keller | G06F 3/013 |
| 2019/0236344 A1* | 8/2019 | Chen | G06F 3/011 |
| 2019/0333261 A1* | 10/2019 | Nakashima | G06F 3/0346 |
| 2019/0340821 A1* | 11/2019 | Chen | G06F 3/0482 |
| 2020/0004401 A1* | 1/2020 | Hwang | G06F 3/017 |

\* cited by examiner

INTERACTIVE EXERCISE AND TRAINING SYSTEM AND METHOD

TECHNICAL FIELD

The subject disclosure relates generally to virtual reality-based training and exercise systems and methods.

BACKGROUND OF THE RELATED ART

Recreational punching bags have been in use for many years. More recently, manufacturers have been including sensors and electronic devices to detect and visually/audibly register strikes of particular targets on the punching bag. A typical boxing system of this type provides punching pads disposed on some structure for hand and/or foot punch by a user. Sensors are connected to the pads for detecting strikes, and a controller is coupled to each sensor. A display may also be provided to output video and audio, e.g., for strike training, or providing quantitative feedback of actual strike results to the pads. These systems may be integral to the punching bag or supported in other structures that are mounted on the bag. Control electronics in or associated with these systems also may suitably programmed or adapted to interact (e.g., via WiFi or Bluetooth) with connected computers or mobile devices, and training sessions may be gamified, e.g., by integrating music, lighting, and other interactive content.

An alternative to the above are so-called "virtual reality" (VR) systems, which systems provide immersive boxing-like environments using handheld controllers held in both hands. A typical VR system includes a head-mounted display (HMD), a forward-looking camera coupled to the HMD, and one or more hand-held controllers that are communicatively-coupled to the HMD. A hand-held controller typically includes one or more user-input keys, a grip, an outward-facing surface coupled to the grip, and illumination sources mounted on or embedded in the outward-facing surface of the controller. The forward-looking camera detects light reflected or emitted by the illumination sources. In operation, the HMD uses the forward-looking camera to detect movement of the illumination sources by tracking positions of light reflected or emitted to model actions of the user's hand(s) in the virtual-reality system. Thus, e.g., the camera may detect various movements of the hand-held controller, such as punching movements, throwing movements, hitting movements when playing a sport, and the like. Motions of the hand-held controller correspond to various commands such that the motions are transferred into actions in the virtual reality system. A commercial VR system of this type is the Oculus® Quest.

In a VR system such as described above, and prior to initiating the VR experience, a user may establish a "boundary" for a play area within a room. As the VR experience proceeds, the system tracks the user's head and controller, and the system can provide visual or other feedback to the user to ensure that the user stays within the defined boundary.

While virtual reality systems as described above provide significant advantages, these systems do not provide for spatially-locating and/or interacting with real (physical) objects within a three-dimensional (3D) space. As such, the action carried out is limited to a representation of a general position of the user, and the user's physical hand motions (e.g., punching) do not necessarily provide the user a real boxing experience.

BRIEF SUMMARY

A virtual reality (VR) system comprising a head-mounted display (HMD) and handheld controller set is enhanced to provide a more realistic end user VR experience, e.g., for boxing or other interactive training. In this approach, and in lieu of simply establishing a boundary area for the VR experience, the user also maps a position of a real-world object into a reference frame of the VR environment. This mapping is facilitated using the handheld controller itself, e.g., as positioned in a backwards-facing manner on the user's forearm. The real-world object is then simulated in the 3D VR environment as rendered by the VR HMD, and the user interacts with the real-world object (or its simulation) to provide a more enjoyable and useful interactive experience.

The foregoing has outlined some of the more pertinent features of the subject disclosure. These features should be construed to be merely illustrative. Many other beneficial results can be attained by applying the disclosed subject matter in a different manner or by modifying the subject matter as will be described.

DETAILED DESCRIPTION

Figure 1:
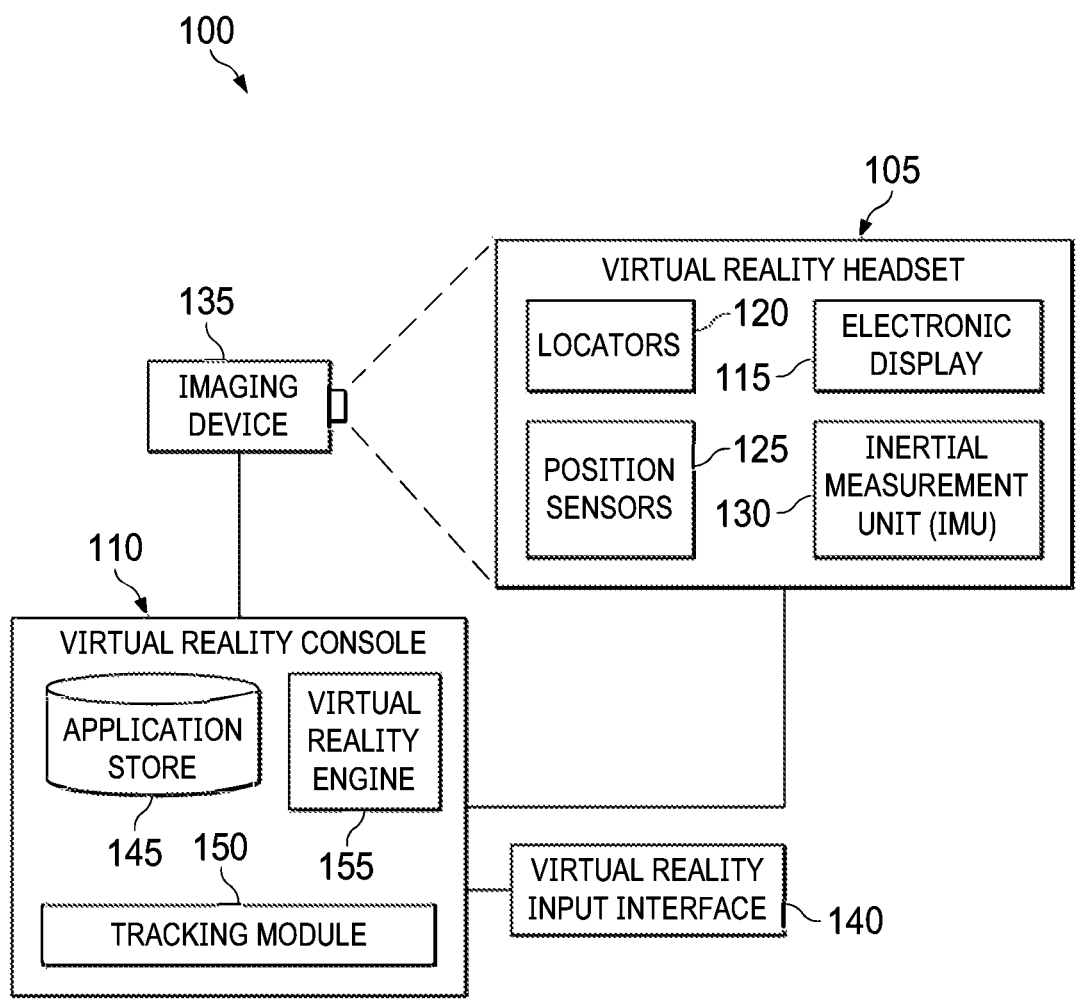
FIG. 1 depicts a known virtual reality (VR) gaming and entertainment system in which the technique of this disclosure may be implemented.

FIG. 1 is a block diagram of a known virtual reality (VR) system environment 100 in which a VR console 110 operates. The system environment 100 comprises a VR headset 105, an imaging device 135, and a VR input interface 140 that are each coupled to the VR console 110. The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. Typically, the VR headset 105 includes an electronic display 115, one or more locators 120, one or more position sensors 125, and an inertial measurement unit (IMU) 130. The electronic display 115 displays images to the user in accordance with data received from the VR console 110. The display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In some embodiments, the locators are located beneath an outer surface of the VR headset 105.

The IMU 130 is an electronic device that generates calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, or any other suitable type of sensor, or some combination thereof. The position sensors 125 may be located external to the IMU 130, internal to the IMU 130, or some combination thereof. Based on the one or more measurement signals from one or more position sensors 125, the IMU 130 generates calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point (e.g., intermediate estimated position) on the VR headset 105. Alternatively, the IMU 130 provides the sampled measurement signals to the VR console 110, which determines the calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more first calibration parameters from the VR console 110. The first calibration parameters are used to maintain tracking of the VR headset 105. Based on a received calibration parameter (e.g., IMU parameters), the IMU 130 may adjust its operation (e.g., change sample rate, etc.).

The imaging device 135 generates second calibration data in accordance with calibration parameters received from the VR console 110. Second calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110. The imaging device 135 receives one or more calibration parameters from the VR console 110, and may adjust one or more imaging parameters (e.g., focal length, focus, frame rate, ISO, sensor temperature, shutter speed, aperture, etc.) based on the calibration parameters.

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes a media store 145, a tracking module 150, and a virtual reality (VR) engine 155.

The application store 145 stores one or more applications for execution by the VR console 110. An application is a group of instructions, that when executed by a processor, generates media for presentation to the user. Media generated by an application may be in response to inputs received from the user via movement of the HR headset 105 or the VR interface device 140. Examples of applications include: gaming applications, conferencing applications, video playback application, or other suitable applications.

The tracking module 150 calibrates the system environment 100 using one or more calibration parameters. Typically, calibration performed by the tracking module 150 also accounts for information received from the IMU 130. Re-calibration of the system environment 100 is generally transparent to the user. In some embodiments, the tracking module 150 may prompt the user to move the VR headset 105 to an orientation where one or more sides of the VR headset 105 are visible to the imaging device 135. For example, the tracking module 150 prompts the user to look up, to look down, to look left, to look right, or look in another specified direction so one or more sides of the VR headset 105 are visible to the imaging device 135. Once a threshold number of locators 120 on the VR headset 105 are imaged by the imaging device 135, the tracking module 150 re-establishes calibration. In some embodiments, the tracking module 150 may continually calibrate the system environment 100 or calibrates the system environment 100 at periodic intervals to maintain accurate tracking of the VR headset 105.

Additionally, the tracking module 150 tracks movements of the VR headset 105 using second calibration data from the imaging device 13. In particular, the tracking module 150 determines positions of a reference point of the VR headset 105 using observed locators from the second calibration data and a model of the VR headset 105. The tracking module 150 also determines positions of a reference point of the VR headset 105 using position information from the first calibration data. Additionally, in some embodiments, the tracking module 150 may use portions of the first calibration data, the second calibration data, or some combination thereof, to predict a future location of the headset 105. The tracking module 150 provides the estimated or predicted future position of the VR headset 105 to the VR engine 155.

The VR engine 155 executes applications within the system environment and receives position information, acceleration information, velocity information, predicted future positions, or some combination thereof, of the VR headset 105 from the tracking module 150. Based on the received information, the VR engine 155 determines media to provide to the VR headset 105 for presentation to the user. For example, if the received information indicates that the user has looked to the left, the VR engine 155 generates media for the VR headset 105 that mirrors the user's movement in a virtual environment.

Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

To use the system, a user typically performs an initial setup that establishes and validates a defined boundary for a minimum required space for the play area within a room. In the Oculus® Quest™ system, this operation is performed by a so-called "guardian" component. Typically, or upon an initial use of the system, a boundary is created for a play area within the room before the user begins the VR experience. The boundary setup process typically is performed with the HMD mounted on the user's head. Then, e.g., upon system boot-up, the user is prompted to established a boundary. In response to the user entering a command to establish the boundary, the system detects the floor height; in the alternative, the user selects a manual option and moves the controller to the floor. The user then uses a controller to trace out a play area on the ground. Once the play area is traced out in this manner, the user confirms the boundary. When the user then starts the VR experience with the new boundary defined, the system automatically tracks the user within the confines of the associated bounds defined by the boundary. If the user's head or controllers approach the edge of the boundary space, camera view may be adjusted so that the user can avoid objects outside of the space and return safely to the play area.

Figure 2:
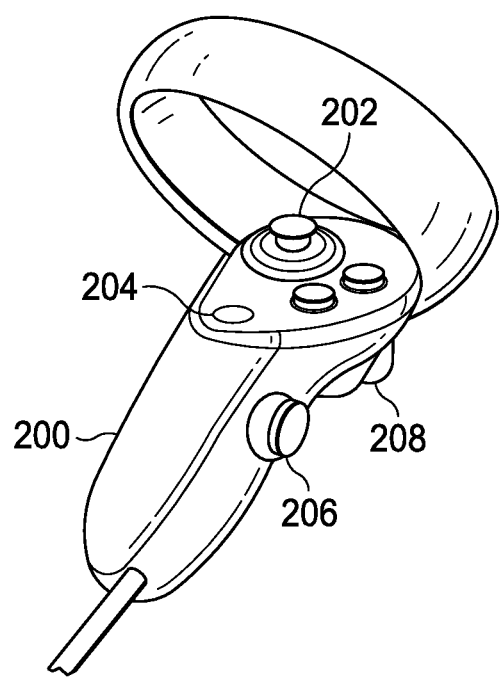
FIG. 2 depicts a known handheld controller for the VR system shown in FIG. 1.

FIG. 2 depicts a representative VR controller of the above-described prior art system. The controller for the user's left hand comprises a body 200 that is designed to be held within the palm of the user's hand, and that includes various controllers, such as a thumb stick 202, a menu button 204, a grip button 206, and a trigger 208. The system also includes a similar controller for the user's right hand. Thus, the system includes a pair of such handheld controllers, each providing six (6) degrees of freedom (6DOF) tracking with respect to the position and rotation of each handheld controller as it is held in the user's hand. Thus, when the controller is a certain distance from the floor, its virtual representation also is that same distance from a virtual floor as represented to the user in the HMD. Typically, the HMD also supports 6DOF relative to its surroundings.

Figure 3:
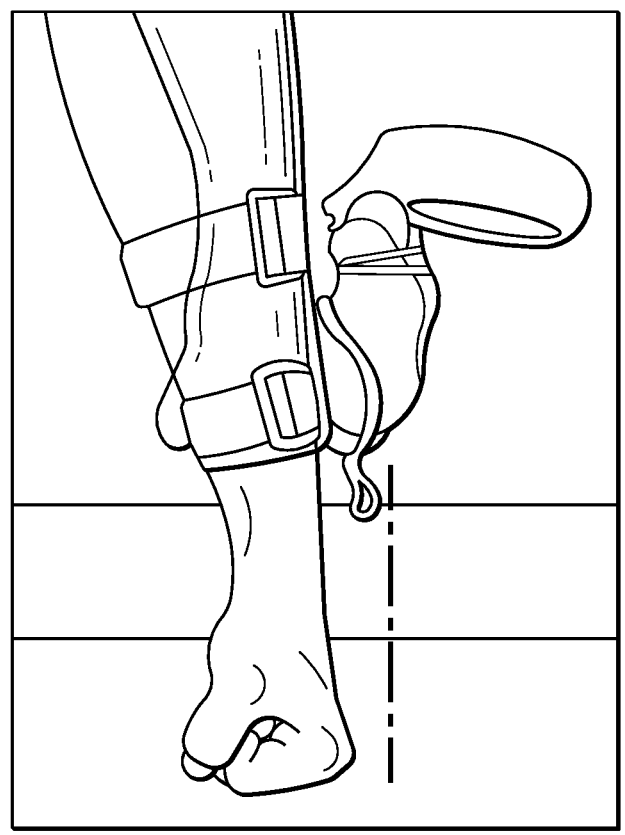
FIG. 3 depicts a reverse or backwards-mounting of a handhold controller according to this disclosure, as well as a technique to calibrate a location of the user's fist relative to the backwards-mounted controller.
Figure 4A:
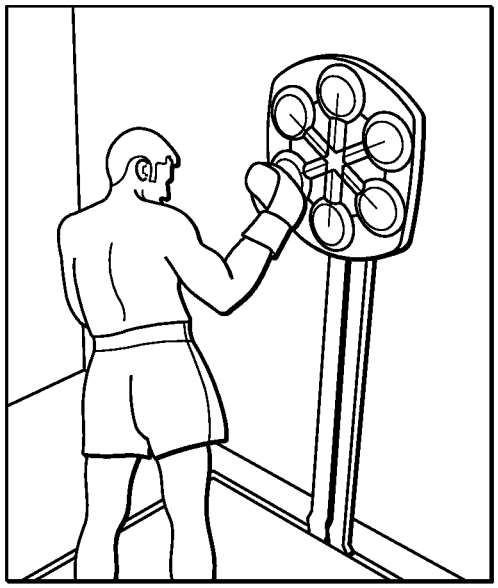
FIGS. 4A-4D depict follow-on calibration of the backwards-mounted handheld controller with respect to a physical device (e.g., a punching bag) within a guardian boundary.
Figure 4B:
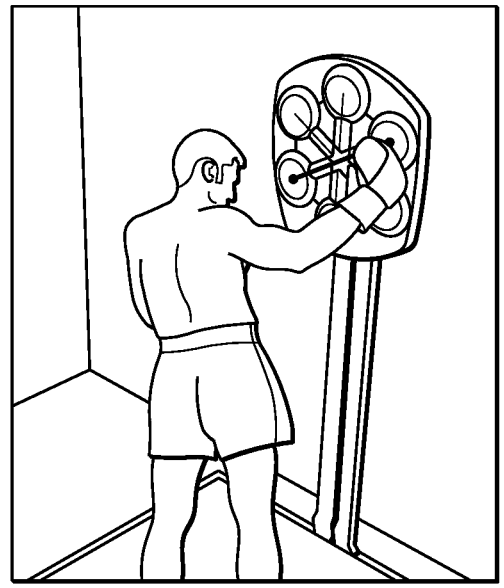
Figure 4C:
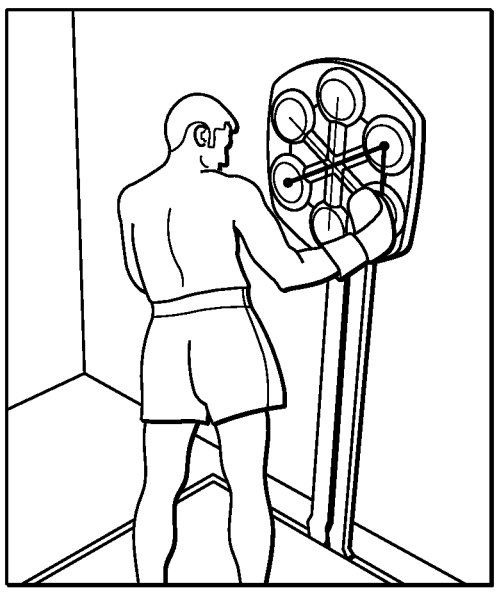
Figure 4D:
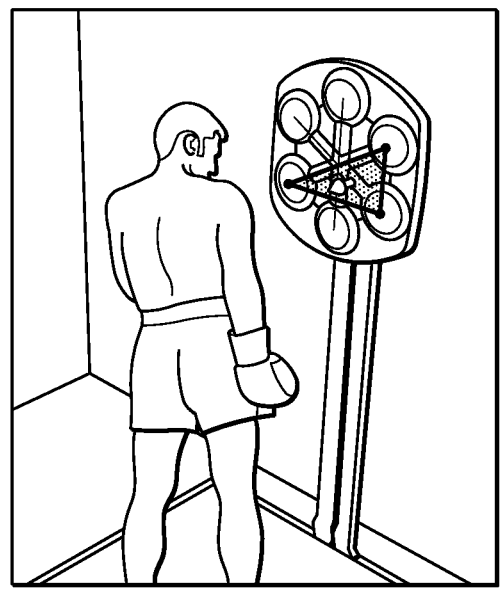

With the above as background, the technique of this disclosure is now described. Although the technique is described below in the context of the above VR system, this is not a limitation, as the approach herein is platform-independent, and it can be used on any VR system that support 6DOF tracking for both the HMD and the controllers. According to this disclosure, and in lieu of holding a controller within the user's palm, preferably the controller is fitted with one or more straps such that the controller is instead mounted in a backwards-facing manner, e.g., on the user's forearm. This mounting configuration is depicted in FIG. 3, for the left hand (forearm) controller. As shown, and in this example, the controller is fitted with one or more wrist straps that are used to secure the controller to the user's forearm. A similar configuration is provided for the right hand controller. In the approach herein, and due to the fact that different users have different forearm lengths or may wear the controllers at different points along their forearms, the endpoint of the user's fist is not consistent (across users) and therefore unknown to the system. To address this, according to this disclosure an endpoint calibration operation is first carried out with respect to the controller; this calibration operation is now described.

In one embodiment, and as depicted in FIG. 3, during calibration and with the wrist strap(s) in place, the user places his or her fist on the floor. Because the controller is tracked in 1:1 space relative to the virtual space, the system calculates the distance from the virtual controller to the virtual floor. This distance is then used to set an endpoint of the user's fist. As noted above, the endpoint location (spatially) is dependent on the user's anatomy and where the controller is positioned. To start calibration, the user presses a button on the controller. Once in calibration mode, the distance from the controller to the floor is stored, e.g., every frame, and then a lowest-achieved distance may then be set as an endpoint offset. The notion here is that the closest the controller gets to the floor is when the user's fist is pressed against the floor. In an alternative embodiment, and in lieu of calibrating each controller separately with respect to the floor, a preferred approach is to have the user positioned the controllers (on each forearm), and then place the user's hands (with fingers curled) back-to-back. The distance to the end of the user's fist is then computed by determining the overall distance between the controller and then simply dividing by two.

Once the distance calibration to the end of the user's closed fist is determined, preferably the user then performs an additional calibration, e.g., to calibrate the user's closed fist with respect to a position of a physical object whose location is projected into the virtual reality field-of-view, preferably located within (or adjacent) the guardian boundary that has been (or will be) established for the VR session. In particular, and according to the technique of this disclosure, the real physical object is simulated within the VR experience (and thus is visible to the user via the HMD) while it is also physically present in the room itself. Thus, and in the case of a VR experience that involves a virtual boxing or similar "workout" using the HMD, the user interacts with the projected object he or she experiences as being present in the VR experience while also simultaneously physically interacting with respect to the actual object itself that also is present (but in the real world environment that is external to the HMD field-of-view). In this manner the user receives physical feedback from the actual physical object while he or she is interacting with a virtual representation of that physical object that is projected into the VR experience. As an example, the physical (real-world) object may be a striking target, a punching bag, a wall, etc. That object has a surface that is projected into the VR experience at a position that is determined by a second calibration operation, which is now described.

In particular, the user performs the fist-based endpoint calibration as described, and then performs the follow-on calibration, which is now described. For explanatory purposes, in this example, the physical device is a strike pad such as described in U.S. Pat. No. 10,124,227 assigned to the assignee of the present application. In this calibration, the user places his or her fist (as calibrated above) against a set of points on the strike pad, and then presses a button each time, thereby storing a location of the fist endpoint as a point in 3D space. Typically, calibration of the device requires three (3) points, two on opposing (diagonal) pads, and then a third on any other pad. This is depicted in FIGS. 4A-4D. The first two points (FIG. 4A and FIG. 4B) are used to set the position of the device generally. Because the device (in this example) is symmetrical, bisecting the line between two opposing pads (FIG. 4C) provides a determination of the center of the device in 3D space. The third point is used to orient the rotation of the device. Using three points in space, the system then calculates a cross product from the triangle (FIG. 4D) and returns a normal direction. The physical device's forward direction is then set with respect to the normal direction. The touch points are shown as dots, and the normal direction is depicted by the arrow in FIG. 4D. In this manner, and using the second calibration, a front-facing "surface" of the physical object is determined. Once this surface is identified, its position within the guardian area is also determined or determinable, and thus the "surface" can then be projected into the VR experience.

The physical device is not limited to the starburst strike pad arrangement in FIGS. 4A-4D. As noted above, the physical device may be a generic punching bag, or even just a physical wall. Rectangular punching bags can be calibrated in the same way as described above, where the three points correspond to three of the four corners of the bag. These points are also used to set an aspect ratio of a virtual bag, thus ensuring that the virtual bag has the same height and width of the physical bag.

After spatially locating a real object (e.g., a strike pad, a punching bag, a wall, etc.) in this manner, the VR experience is initiated. It is assumed that a defined boundary area (the guardian area) is also present. By calibrating the user's fist(s) and the configuration and location of the real object, the striking surface of that object is then positioned within (projected into) the user' display view as provided by the HMD. The user then interacts in the VR session and with the physical object being present in the room, so that physical feedback is also provided to the user as he or she interacts with the surface that is visualized with the HMD. Although it is preferred that the physical object is present such that the user receives actual feedback when he or she strikes the actual target, this is not a requirement, as the punching simulation may be carried out entirely virtually (but with the location of the physical device as determined above superimposed in the virtual environment). If the physical object is not present when the VR experience begins, the VR system may provide some other controller-generated sensory feedback to the user when the user strikes the virtual strike pad or punching bag. In still another alternative embodiment, the virtual strike pad/bag is replaced/supplemented by a virtual opponent or sparring partner, trainer or coach, and the VR experience proceeds as if the user were involved in an actual match. The virtual opponent may be a representation of an alien or some other fighter; irrespective of the representation used, preferably the opponent has a striking surface that corresponds to the surface determined by the second calibration. Thus, e.g., and when the strike pad arrangement (of FIG. 4) is used to determine the surface, the system can represent that surface in any desired manner (e.g., as a bag, an opponent's striking mitt, a weapon, etc.). In this embodiment, the virtual opponent is then perceived by the user as aligned with the surface (the strike pad/bag/weapon, etc.) as the end user moves relative thereto and strikes that surface during the VR session.

Figure 5A:
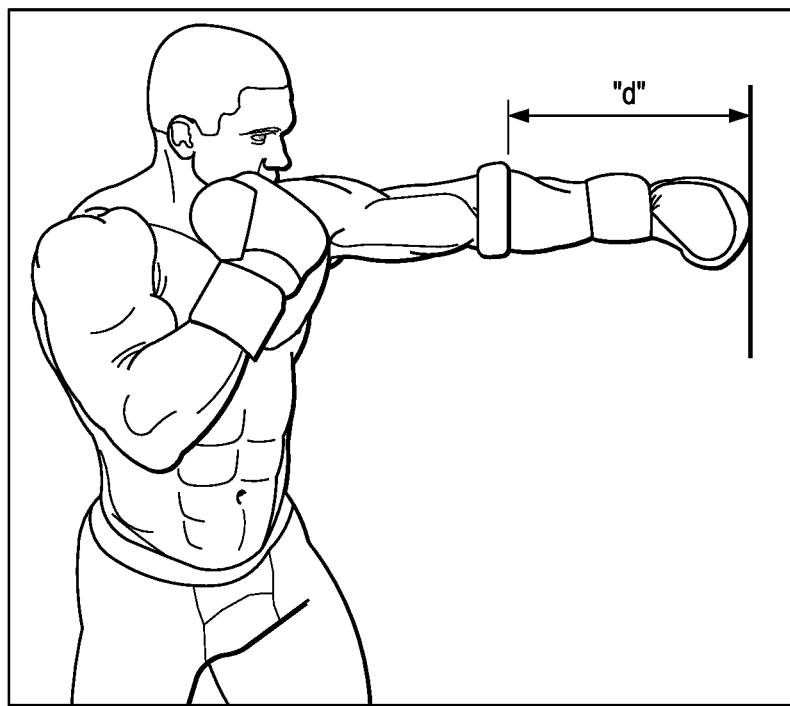
FIGS. 5A-5D depict the technique of spatially projecting a real-world object into a three-dimensional (3D) virtual space according to this disclosure.
Figure 5B:
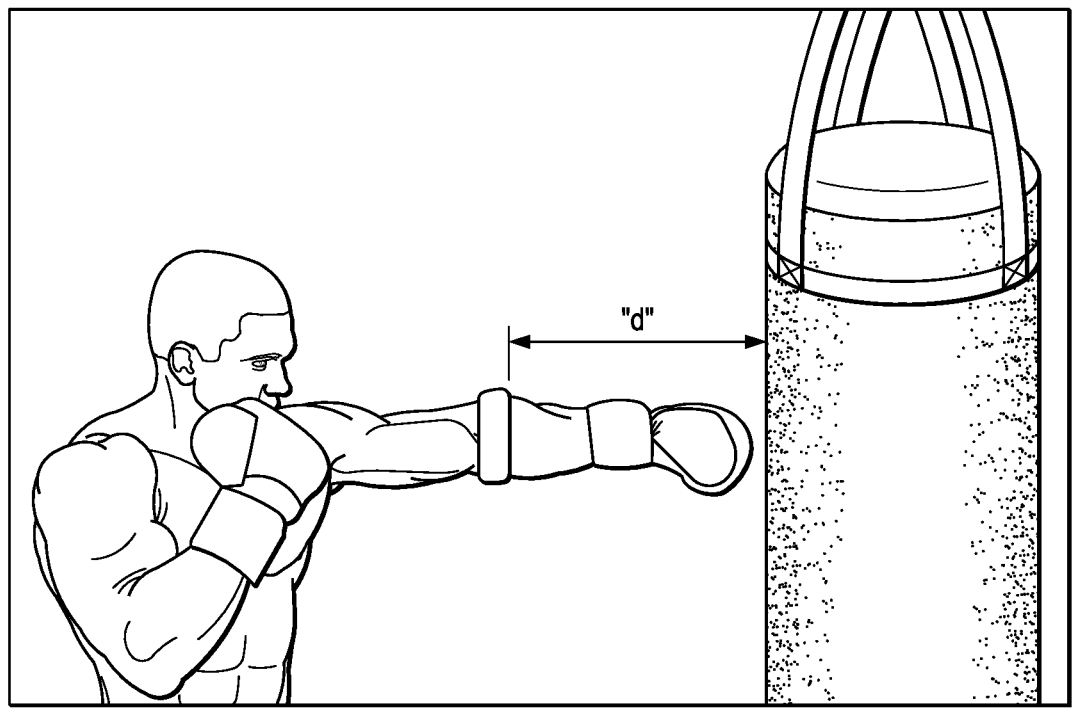
Figure 5C:
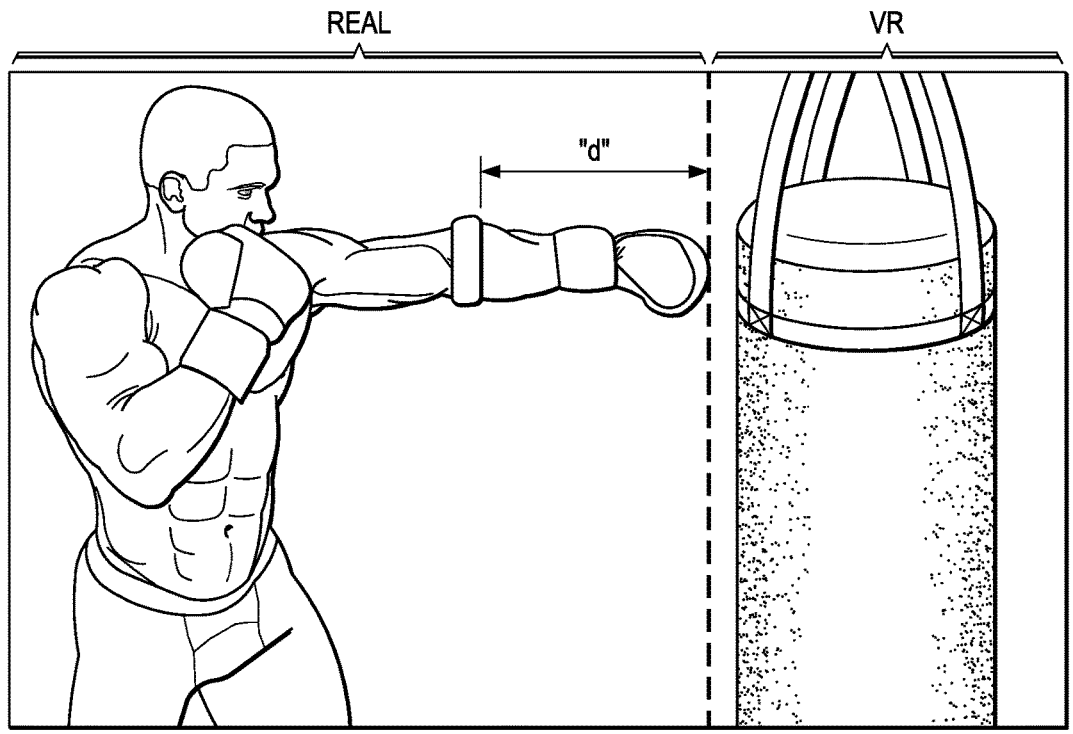
Figure 5D:
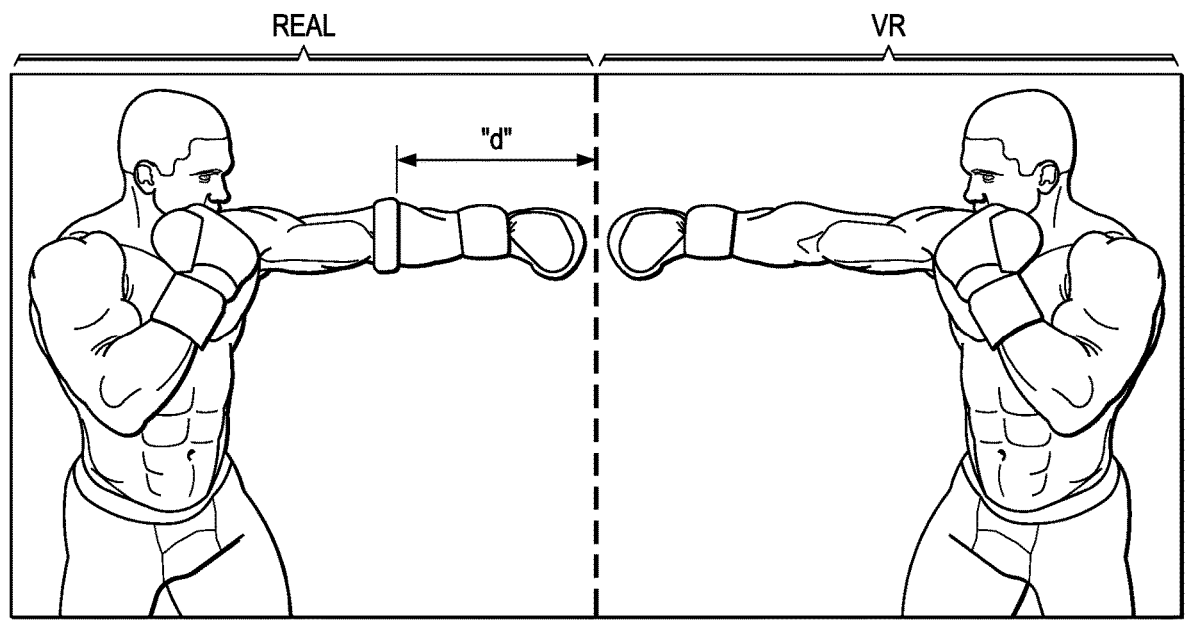

FIGS. 5A-5D depict the technique of this disclosure in additional detail. In FIG. 5A, the end user dons the controller and the distance "d" to the end user's closed fist (in this example) is determined. In FIG. 5B, the end user performs the follow-on calibration to identify the set of points that define the striking surface; preferably, a real-world object (or a wall) is used for this purpose. In FIG. 5C, and after the end user initiates the VR session, the VR rendering (in this case a boxing bag) is depicted, and preferably a surface thereof corresponds to the real-world location of the actual object. Thus, when the end user extends his or her arm the distance "d," the end user strikes both the real-world target, as well as the VR-generated surface. FIG. 5D depicts a variant of FIG. 5C wherein the VR-generated surface corresponds to a strike point of a VR-generated image, in this case a virtual opponent.

Thus, according to the disclosure the system maps points in a real-world object to XYZ points in a reference frame of the VR environment. The points typically comprise a planar surface, and that surface may be flat, curved, continuous or discontinuous. As has been described, preferably this mapping is accomplished using controller sensors (gyro and accelerometer) that are specially calibrated to the VR environment by first calibrating the user's endpoint. As noted, in the described embodiment, the controller position is calibrated with respect to a user's appendage (e.g., a forearm), such as the user's closed fist, such that a striking surface-to-appendage interaction is aligned and consistent across both the physical and virtual environments.

By using the handheld controller to find XYZ points of a physical object, that object is then readily simulated in the VR environment, thus enabling the system to provide a realistic and simple-to-configure VR experience for the user.

The appendage on which the controller is positioned is not limited to a user's forearm. The controller may be positioned on a user's leg, e.g., for a kickboxing simulation.

The technique may also be used in an augmented reality (AR) simulation wherein a virtual object is simulated on physical objects in the real world, e.g., through use of a real-time video feed. Such a technique may be implemented using the system of FIG. 1 with the head set's existing cameras.

Having described the subject matter, we claim:

1. A method of spatially projecting a real-world object into a three-dimensional (3D) virtual space, comprising:
   receiving a first control signal from a controller positioned on a user's appendage, the controller having an associated virtual reality (VR) head-mounted display (HMD);
   based on the first control signal, calibrating the controller to identify an endpoint position of the user's appendage with respect to a reference frame in a VR environment;
   using the controller as calibrated, receiving one or more second control signals mapping given points of the real-world object surface to points in the reference frame of the VR environment, the given points comprising a surface of the real-world object;
   projecting the surface into the 3D virtual space rendered by the VR HMD; and thereafter, and responsive to interaction between the controller endpoint position and the surface, tracking a user's simulated interaction with the real-world object;

wherein the second control signals are generated by touching the controller with respect to first, second and third distinct points on the surface, and storing the location of each such distinct point.

2. The method as described in claim 1 wherein the first, second and third distinct points are traced as a triangle along a plane corresponding to the surface.

3. The method as described in claim 1 wherein the first control signal is received from one of: the controller backwards-positioned on the user's forearm, and the controller positioned on the user's leg.

4. The method as described in claim 1 wherein calibrating the controller to identify the endpoint position comprises determining a distance from the controller to a fixed physical location over a set of frames, identifying a frame with a lowest distance, and setting that distance at the endpoint position.

5. The method as described in claim 1 wherein the spatially-projected 3D object is overlaid onto real-time video of an associated operating environment.

6. A method of spatially projecting a real-world object into a three-dimensional (3D) virtual space, comprising:

receiving a first control signal from a controller positioned on a user's appendage, the controller having an associated virtual reality (VR) head-mounted display (HMD);

based on the first control signal, calibrating the controller to identify an endpoint position of the user's appendage with respect to a reference frame in a VR environment;

using the controller as calibrated, receiving one or more second control signals mapping given points of the real-world object surface to points in the reference frame of the VR environment, the given points comprising a surface of the real-world object;

projecting the surface into the 3D virtual space rendered by the VR HMD; and thereafter, and responsive to interaction between the controller endpoint position and the surface, tracking a user's simulated interaction with the real-world object;

wherein the real-world object is a punching surface or a wall.

7. The method as described in claim 6 wherein the first control signal is received from one of: the controller backwards-positioned on the user's forearm, and the controller positioned on the user's leg.

8. The method as described in claim 6 wherein calibrating the controller to identify the endpoint position comprises determining a distance from the controller to a fixed physical location over a set of frames, identifying a frame with a lowest distance, and setting that distance at the endpoint position.

9. The method as described in claim 6 wherein the spatially-projected 3D object is overlaid onto real-time video of an associated operating environment.

10. The method as described in claim 6 wherein the punching surface comprises a set of individual targets.

11. The method as described in claim 10 wherein the set of individual targets are configured in a starburst arrangement around a center point.

12. A method of spatially projecting a real-world object into a three-dimensional (3D) virtual space, comprising:

receiving a first control signal from a controller positioned on a user's appendage, the controller having an associated virtual reality (VR) head-mounted display (HMD);

based on the first control signal, calibrating the controller to identify an endpoint position of the user's appendage with respect to a reference frame in a VR environment;

using the controller as calibrated, receiving one or more second control signals mapping given points of the real-world object surface to points in the reference frame of the VR environment, the given points comprising a surface of the real-world object;

projecting the surface into the 3D virtual space rendered by the VR HMD;

simulating a virtual opponent within the VR environment, the opponent holding an element configured for striking, the element aligned with the surface; and thereafter, and responsive to interaction between the controller endpoint position and the surface, tracking a user's simulated interaction with the real-world object.

13. The method as described in claim 12 wherein the first control signal is received from one of: the controller backwards-positioned on the user's forearm, and the controller positioned on the user's leg.

14. The method as described in claim 12 wherein calibrating the controller to identify the endpoint position comprises determining a distance from the controller to a fixed physical location over a set of frames, identifying a frame with a lowest distance, and setting that distance at the endpoint position.

15. The method as described in claim 12 wherein the spatially-projected 3D object is overlaid onto real-time video of an associated operating environment.

16. A method of spatially projecting a real-world object into a three-dimensional (3D) virtual space, comprising:

receiving a first control signal from a controller positioned on a user's appendage, the controller having an associated virtual reality (VR) head-mounted display (HMD);

based on the first control signal, calibrating the controller to identify an endpoint position of the user's appendage with respect to a reference frame in a VR environment;

receiving additional control signals defining a boundary area for the VR environment;

using the controller as calibrated, receiving one or more second control signals mapping given points of the real-world object surface to points in the reference frame of the VR environment, the given points comprising a surface of the real-world object;

projecting the surface into the 3D virtual space rendered by the VR HMD; and thereafter, and responsive to interaction between the controller endpoint position and the surface, tracking a user's simulated interaction with the real-world object.

17. The method as described in claim 16 wherein the user's simulated interaction with the real-world object occurs within the boundary area.

18. The method as described in claim 16 wherein the first control signal is received from one of: the controller backwards-positioned on the user's forearm, and the controller positioned on the user's leg.

19. The method as described in claim 16 wherein calibrating the controller to identify the endpoint position comprises determining a distance from the controller to a fixed physical location over a set of frames, identifying a frame with a lowest distance, and setting that distance at the endpoint position.

20. The method as described in claim 16 wherein the spatially-projected 3D object is overlaid onto real-time video of an associated operating environment.

* * * * *